US006848494B2

(12) United States Patent
Newell et al.

(10) Patent No.: US 6,848,494 B2
(45) Date of Patent: Feb. 1, 2005

(54) WETTING AGENT FOR INFILTRATED ALUMINUM PREFORMS

(75) Inventors: Kenneth J. Newell, Valencia, CA (US); Charles H. Zenuk, Stevenson Ranch, CA (US)

(73) Assignee: 3D Systems, Inc., Valencia, CA (US)

(*) Notice: Subject to any disclaimer, the term of this patent is extended or adjusted under 35 U.S.C. 154(b) by 0 days.

(21) Appl. No.: 10/260,102

(22) Filed: Sep. 27, 2002

(65) Prior Publication Data

US 2004/0060682 A1 Apr. 1, 2004

(51) Int. Cl.$^7$ .......................... B22D 19/02; B22D 19/14
(52) U.S. Cl. ........................................ 164/98; 164/97
(58) Field of Search ..................................... 164/97, 98

(56) References Cited

U.S. PATENT DOCUMENTS

| 4,491,558 A | * | 1/1985 | Gardner ........................ 419/23 |
| 4,828,008 A | | 5/1989 | White et al. |
| 4,863,538 A | | 9/1989 | Deckard |
| 5,020,584 A | | 6/1991 | Aghajanian et al. |
| 6,416,850 B1 | | 7/2002 | Bredt et al. |

OTHER PUBLICATIONS

Lee, Kon Bae and Kwon, Hoon, "Fabrication and Characteristics of AA6061/Si$_3$N$_{4p}$ Composite by the Pressureless Infiltration Technique," *Metallurgical and Materials Transactions A*, vol. 30A, Nov. 1999, pp. 2999–3007.

Sercombe, T.B. and Schaffer, G.B., "Sintering Development for Free Formed Maraging Steel," *International Conference on Powder Mettalurgy and Particulate Materials*, Vancouver, Canada, Jul. 1999.

Lumley, R.N. and Schaffer, G.B., "The Effect of Solubility and Particle Size on Liquid Phase Sintering," *Scripta Materialia*, vol. 35, No. 5, 1996, pp. 589–595, Elsevier Science Ltd.

Lumley, R.N. and Schaffer, G.B., "The Effect of Additive Particle Size on the Mechanical Properties of Sintered Aluminum–Copper Alloys," *Scripta Materialla*, vol. 39, No. 8, 1998, pp. 1089–1094, Elsevier Science Ltd.

"Behavior of Magnesium Dissolved in the Surface of Aluminum Alloy Powders," *J. Japan Inst. Metals*, vol. 63, No. 9, 1999, pp. 1191–1196 (Abstract only).

"Behavior of Magnesium in the Surface of Aluminum Alloy Powders," *J. Japan Inst. Metals*, vol. 63, No. 9, 1999, pp. 1191–1196.

* cited by examiner

*Primary Examiner*—Kuang Y. Lin
(74) *Attorney, Agent, or Firm*—Ralph D'Alessandro

(57) ABSTRACT

A method for the manufacture of a three-dimensional object includes the steps of forming a mixture that contains a binder, a wetting agent, and a least one of aluminum or a first aluminum-base alloy into a green composite, removing the binder from said green composite forming a porous preform structure and infiltrating the porous preform structure with a molten second aluminum base alloy to form the three-dimensional object with near theoretical density. The wetting agent assists in wetting during infiltration. The green composite may be formed by an additive process such as computer aided rapid prototyping, for example selective laser sintering. The method facilitates the rapid manufacture of aluminum components by an inexpensive technique that provides high dimensional stability and high density.

43 Claims, 5 Drawing Sheets

WETTING AGENT FOR INFILTRATED ALUMINUM PREFORMS

CROSS REFERENCE TO RELATED APPLICATION(S)

Not Applicable

U.S. GOVERNMENT RIGHTS

Not Applicable

BACKGROUND OF THE INVENTION

1. Field of the Invention

This invention relates generally to a method for the rapid manufacture of aluminum alloy components and can have specific application to limited production runs, such as those encountered in rapid prototyping or rapid manufacturing. More particularly it relates to a wetting agent used in a method whereby a porous aluminum or aluminum alloy preform is formed into a desired shape and supported by a polymeric binder. The infiltration of a second, lower melting temperature, aluminum alloy into the porous preform is facilitated by the wetting agent to form a dense structurally sound component.

2. Description of the Related Art

Aluminum and aluminum alloy components are traditionally fabricated by casting, mechanical working or machining, as well as combinations of these processes. When casting, molten metal fills a mould having an internal cavity formed into the shape of a desired component. After the molten metal cools and solidifies, the component is removed from the mould in either net shape (finished form) or near net shape (close to finished form, but requiring some additional working or machining). When mechanical working, such as forging, drawing, rolling, extrusion or stamping, a cast billet of the metal is mechanically deformed into the shape of the desired component. Casting requires moulds machined to the shape of the desired component while tools used to apply mechanical deformation require dies formed to the required shape. While both casting and mechanical working are well suited for the economical manufacture of large quantities of identically shaped components, neither is particularly suitable for specialty applications or prototypes where only a few components are required or where various aspects of the shape are to be varied from component to component.

Aluminum and aluminum alloy components can also be machined from stock material that may have been mechanically worked or cast. Machining is time consuming, has a very poor utilization of raw material and requires skilled operators. Machined components are therefore expensive and slow to produce.

Aluminum powders can also be used to fabricate parts, either to take advantage of a unique property set or because net shape parts can be inexpensively fabricated. In the former case, the powders are typically consolidated by extrusion, forging or hot isostatic pressing. Net shape parts are made by pressing aluminum powder in a die to form a shape. The aluminum powders may be either alloyed or unalloyed and may be formed with or without other metallic or non-metallic particulate materials. After pressing, the part is ejected from the die and the so-called green body is sintered in a furnace at elevated temperatures under a controlled atmosphere, commonly nitrogen. Aluminum, and aluminum alloys, have a propensity to form a highly stable alumina ($Al_2O_3$) surface film that passivates the individual powder particles limiting further oxidation. The surface oxide also hinders the diffusional mechanisms needed to sinter aluminum powder preforms into fully dense aluminum components. As a solution to this challenge, the aluminum powder industry has developed blends of aluminum powder, surface oxide reducing agents, lubricants and sintering agents. These blends are pressed at extremely high pressures (nominally in excess of 30,000 pounds per square inch) into hard tooling cavities to achieve green densities as high as 95%. By this process, the surface oxides are broken up due to deformation exposing metallic aluminum to the sintering aids and, with the addition of heat, enabling full density sintering with isotropic shrinkage. After pressing, the part is ejected from the die and the so-called green body is sintered in a furnace at elevated temperatures under a controlled atmosphere. All of these technologies require tooling or dies which are used to shape the part. This tooling is expensive and is time consuming to produce. This delays the time needed to introduce new products and increases their cost.

An alternative production strategy produces three-dimensional objects directly from the manipulation of data from computer aided design (CAD) databases. Various technologies are known to produce such parts, particularly through the use of additive processes as opposed to subtractive processes such as conventional machining. Important additive processes for the production of such parts include stereolithography, selective laser sintering, laminated object manufacturing, three-dimensional printing and fused deposition modeling. A common feature of all of these rapid prototyping and rapid manufacturing techniques is that energy and/or material is delivered to a point to produce a solid. A series of lines are then traced out to make a cross-sectional layer and a series of layers formed to make a three dimensional part. In principle, there are as many such potential manufacturing systems as there are ways to write or draw on a surface. Producing components in this way has a number of important advantages over traditional manufacturing processes. Most importantly, parts of any shape can be produced directly from a CAD model without the need for expensive tooling or machining and these can be produced in a small fraction of the time that is typically required of traditional manufacturing operations.

Selective laser sintering is described in more detail in U.S. Pat. No. 4,863,538 to Deckard and three-dimensional printing is described in more detail in U.S. Pat. No. 6,416,850 to Bredt, et al. Both the U.S. Pat. No. 4,863,538 patent and the U.S. Pat. No. 6,416,850 patent are incorporated by reference in their entireties herein. These techniques have been used to fabricate objects made from a variety of materials such as photoset resins, other polymers such as nylon and ethylene butadiene styrene, organic waxes, ceramics such as SiN, and metals, most commonly steel.

Recently, aluminum parts have been produced by selective laser sintering and extrusion freeform fabrication. These aluminum parts were fabricated as polymer/aluminum powder composites and post-processed by burning out the polymer and then sintering the remnant metal powder to full or near-full density, in a manner similar to that used in powder injection molding. However, it is extremely difficult to maintain dimensional accuracy during sintering of such a powder preform because of density gradients in the green part and geometrical constraints. While uniform shrinkage can be incorporated into the initial CAD design, non-uniform shrinkage, or distortion, is more difficult to control reproducibly and to accommodate by design. Because dimensional accuracy is a critical criterion for any rapid prototyping/rapid manufacturing system, the inability to accurately sinter large parts is fatal. Only small aluminum parts can presently be made this way: the limit is approximately 1 cm³.

U.S. Pat. No. 4,828,008 discloses that a permeable ceramic mass is spontaneously infiltrated by a molten aluminum alloy containing at least 1%, by weight, of magnesium and optionally also containing silicon. "Spontaneous infiltration" means that the molten metal infiltrates the permeable mass without the requirement for the application of pressure or vacuum (whether externally applied or internally created). U.S. Pat. No. 4,828,008 is incorporated by reference in its entirety herein.

The dimensional accuracy of a component formed is much improved by infiltration, whether spontaneous, pressure-assisted or vacuum-assisted. The loosely formed powder body is lightly pre-sintered and the porous mass is subsequently infiltrated by a liquid metal at a temperature between the melting point of the infiltrant and the base metal. Because there is so little sintering, there is negligible dimensional change between the preform and the finished part. Numerous systems have been fabricated by the rapid prototyping/rapid manufacturing/infiltration route to date, including Fe—Cu, stainless steel-bronze, $ZrB_2$—Cu and SiC—Mg. It is theorized that the alumina surface film on the aluminum and aluminum alloy particles may have prevented the infiltration of porous aluminum components. Aluminum and aluminum base alloys are a conspicuous omission from the successful metallic infiltration systems.

There remains, firstly, a need for a method to spontaneously infiltrate a porous mass of a first aluminum-base material with a molten second aluminum-base material. In addition, there remains a need for an additive process to manufacture aluminum alloy parts that does not have the above-stated deficiencies. The additive process should result in parts with a density close to the theoretical density of the aluminum alloy and be capable of a high level of dimensional accuracy.

BRIEF SUMMARY OF THE INVENTION

In accordance with a first embodiment of the invention, there is provided a method for the spontaneous infiltration of a porous aluminum-base preform. This method includes the steps of forming a mixture that contains a binder, at least one of aluminum or a first aluminum-base alloy, and a wetting agent into a green composite, removing the binder from the green composite forming a porous preform structure, infiltrating the porous preform structure with a molten second aluminum base alloy, to form the three-dimensional object with near theoretical density.

In accordance with a second embodiment of the invention, there is provided a method for the manufacture of a three-dimensional object that includes the steps of forming a mixture that contains a binder, at least one of aluminum or a first aluminum-base alloy, and a wetting agent into a green composite, removing the binder from said green composite forming a porous preform structure, infiltrating the porous preform structure with a molten second aluminum base alloy, to form the three-dimensional object with near theoretical density. The green composite may be formed by an additive process such as computer aided rapid prototyping, for example selective laser sintering or a casting or molding process such as a room temperature vulcanization process like the Keltool® process, metal injection molding, extrusion molding, resin transfer molding, rotational molding, or pressing. The method facilitates the manufacture of aluminum components by an inexpensive technique useful in rapid manufacturing or rapid prototyping that provides high dimensional stability and high density.

For either the first embodiment or the second embodiment, an aluminum nitride skeleton may be formed on the surfaces of the aluminum particles or the particles of a first aluminum-base alloy powder for increased preform strength and dimensional stability.

The wetting agent facilitates the infiltration of the porous structure, improves fluidity of the molten phase of the aluminum or aluminum particles, reduces the tendency of larger parts to crack, and increases the ductility of the finished parts by reducing the need for aluminum nitride which tends to embrittle the final parts.

BRIEF DESCRIPTION OF THE DRAWINGS

These and other aspects, features and advantages of the invention will become apparent upon consideration of the following detailed disclosure of the invention, especially when it is taken in conjunction with the accompanying drawings wherein.

Like reference numbers and designations in the various drawings indicated like elements.

DETAILED DESCRIPTION

Figure 1:
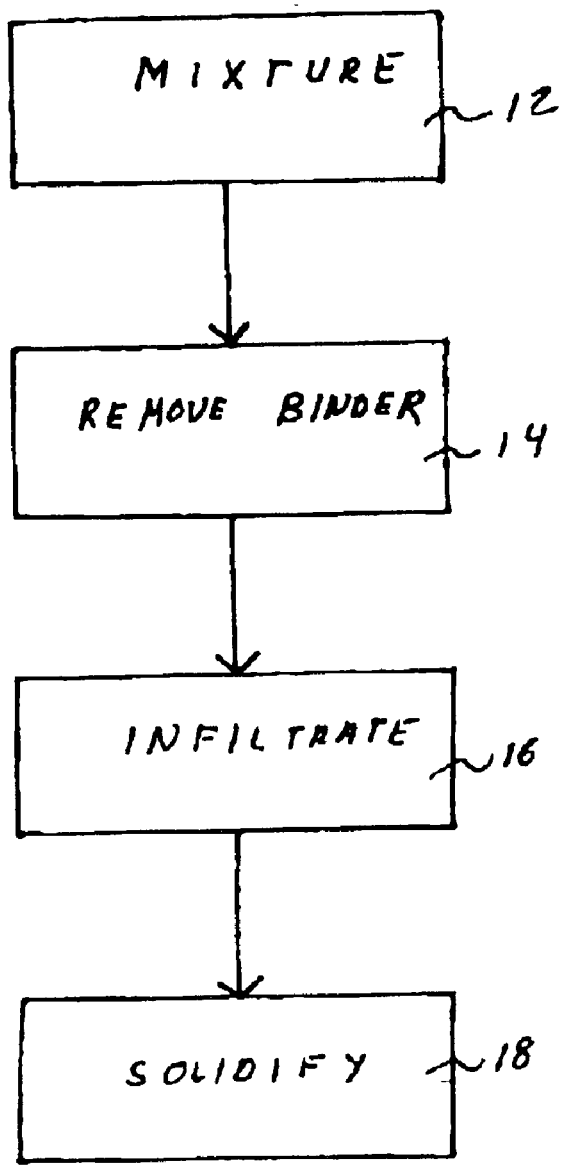
FIG. 1 shows in flow chart representation a process for the infiltration of a porous aluminum-base preform by a molten aluminum-base alloy.

FIG. 1 shows in flow chart representation a sequence of process steps 10 in accordance with a first embodiment of the invention. In a first step 12, a mixture containing a binder and at least one of aluminum or a first aluminum-base alloy is formed into a green composite. As used herein, "aluminum-base" means that the alloy contains at least 50%, by weight, of aluminum.

Preferably the mixture comprises a minimum of three powders blended together. One powder is an aluminum alloy, such as aluminum alloy 6061, that constitutes approximately about 80 to about 95%, by volume, and more preferably from about 85% to about 90%, by volume, of the total mixture. This base metal may be any aluminum-base alloy powder or pure aluminum.

The aluminum or first aluminum-base alloy is in powder form of any effective particle size. Preferably the average particle size is between about 5 and about 150 microns (1 micron=1 $\mu$m=1×10$^{-6}$ meter) and more preferably, the average particle size of the metallic powder is in the range of from about 10 to about 75 microns. One preferred aluminum alloy is aluminum alloy 6061 that has a nominal composition, by weight, of about 0.4% to about 0.8% silicon, about 0.15% to about 0.40% copper, about 0.8% to about 1.2% magnesium, about 0.04% to about 0.35% chromium and the balance aluminum and unavoidable impurities.

As a non-limiting list, the aluminum may be alloyed with one or more of the following elements copper, magnesium, silicon, zinc, titanium, chromium, zirconium, nickel, iron, manganese and silver.

A second powder component of the mixture constitutes approximately about 0.1 to about 4%, by weight, and preferably from about 1.5% to about 2.5%, by weight of the total mixture. This second powder includes an oxygen-scavenger, such as magnesium that cleans the atmosphere surrounding the mixture and reduces the oxide layer on the aluminum-base metal particles. The oxygen scavenger is in particle form with an average particle size of between about 5 and about 150 microns and preferably the average particle size is between about 10 and about 75 microns. Other suitable oxygen scavengers include zirconium, lithium, beryllium, calcium, cerium, lanthanum, neodynium, praesodinium, samarium, thorium, uranium, or misch metal.

As disclosed hereinbelow, while there are benefits to including the oxygen scavenger in the powder mixture, effective infiltration is also obtained if the oxygen scavenger is included in a support layer formed about the green composite, in which case the oxygen scavenger may be omitted from the powder mixture.

A third powder component of the mixture, which constitutes approximately 5–15%, by volume, and preferably about 8% to about 12%, by volume, of the total blend, includes a binder. The binder may be a metallic binder such as zinc stearate, an organic or an inorganic binder, but preferably is an organic polymeric binder. Organic polymeric binders can include thermoplastics with sharp melting points such as nylon 6, nylon 11, nylon 12, copolymers of nylon 12 and nylon 6, polyacetals, polyethylene, polyethylene copolymers, polymethacrylates, polypropylene, and polyether block amides. The average particle size of the polymer binder powder is generally in the range of about 1 to about 50 $\mu$m. The binder is selected to be a material that decomposes to a gas with a minimum of carbon residue when heated to a temperature of between about 300° C. and about 500° C. in an inert, such as nitrogen, atmosphere. Where nitrogen is used to create the inert atmosphere, the nitrogen source can be pure nitrogen, a mixture of gases including nitrogen, any nitrogen rich binder material that evolves nitrogen to form a nitride skeleton, metal nitrides such as transition metal nitrides or magnesium ntiride.

The green composite is heated relatively slowly, such as about 1 to about 2° C. per minute to facilitate binder vapor outgassing from the green composite by way of open, connected, porosity without a build up of localized pockets of vapor pressure that could damage the part. Preferred binders have a relatively low melt flow viscosity (on the order of 25 to 145 grams per 10 minutes) and substantially complete decomposition to nitrogen, nitrogen compounds and other gases when heated to a temperature in the 300°–500° C. range. Suitable binders include the aforementioned nylons, and more specifically Orgasol® 2001 Nylon-12 (gram molecular weight of 17,400, melt flow viscosity of about 25 to about 100 grams per 10 minutes and decomposition temperature of about 433 to about 481° C.), Orgasol® 3501EXD (gram molecular weight of 6,500, melt flow viscosity of about 25 to about 100 grams per 10 minutes and decomposition temperature of about 414 to about 472° C.) and Orgasol® 3501UD (melt flow viscosity of about 25 to about 100 grams per 10 minutes and decomposition temperature of about 425 to about 472° C.). All of these aforementioned Orgasol® nylon binders are available commercially from Atofina SA, of 4–8, cours Michelet-La Défense 10-F-92800 Puteaux-France.

Wetting agents that are added to the preform powder mixture can include any metal useable as a solder exhibiting a melting point lower than that of the second aluminum base alloy. Specific suitable wetting agents include tin, bismuth, lead, antimony, silver or alloys thereof. The wetting agent provides a liquid phase within the green aluminum or aluminum alloy preform that enhances the wettability of the porous structure and improves the fluidity of the molten infiltrant. The molten wetting agent coats or otherwise covers the alumina film that forms on the aluminum or aluminum alloy particles. The resultant parts formed when a suitable wetting agent is used appear to have greater ductility and less tendency to crack as larger parts are made.

A homogeneous green composite of the powders having a desired shape is formed either by deposition in a mould or by using any rapid prototyping technique, such as those described above. A resin bonded preform is formed by exposing the green composite to a suitable cure initiator, such as heat or ultra-violet light. This resin bonded preform has a density of approximately about 50% to about 70% of the theoretical density for the aluminum alloy and structurally has an interconnecting network of pores extending through the preform.

The binder is next removed, as illustrated in FIG. 1 by numeral 14, such as by thermal decomposition, by heating to a temperature in the range of from about 300° C. to about 500° C. with a sufficiently low heat up rate to avoid the formation of high pressure vapor pockets. Removal of the polymer binder will temporarily reduce the integral strength of the part. To provide support, a support powder that will not bond to the part under the processing conditions surrounds the preform. Suitable support powders include ceramics, such as alumina, silicon carbide and boron nitride, mixed with an oxygen scavenger, such as magnesium. As noted above, inclusion of an oxygen scavenger in the support powder may be sufficiently effective to remove the need to include an oxygen scavenger in the mixture of powders forming the green composite.

The oxygen scavenger is present in an amount of from about 0.1% to about 10%, by volume, of the support powder, and more preferably, is present in an amount of from about 0.5% to about 5%, by volume. Other metal powders that may be mixed with the ceramic support powder are titanium, zirconium, lithium, beryllium, calcium, cerium, lanthanum, neodynium, praesodinium, samarium, thorium, uranium, or misch metal and mixtures thereof, either in combination with magnesium or as a substitute for the magnesium.

Once the binder has been removed, the temperature is increased to a temperature, effective to promote the formation of aluminum nitride at low oxygen partial pressures, but not high enough to melt the infiltrant. An aluminum nitride skeleton 36, seen in FIGS. 5 and 6, forms on the surface of the aluminum-base alloy powders. The aluminum nitride skeleton 36 is rigid and significantly increases the strength of the composite. However, because the skeleton is also rigid, an excessively thick skeleton is not desirable due to the resultant decreased ductility. As a result, polymer binders having lower processing temperatures are preferred for enhanced ductility. One suitable thermal profile is about 2 hours at about 540° C. in a nitrogen atmosphere. Since the rigid skeleton provides dimensional stability, it should not be attacked by the liquid infiltrant.

Alloying additions also affect the growth of the nitride skeleton. The nitride formation rate is highest for pure aluminum and lower for aluminum containing additions of silicon and magnesium, referred to as aluminum alloys of the 6xxx series, where x is between 0 and 9. Additions of magnesium absent an inclusion of silicon, referred to as aluminum alloys of the 5xxx series, do not appear to significantly inhibit the nitride formation rate.

In addition to aluminum alloy 6061, the following aluminum alloys have been shown to reduce the rate of nitride formation and are examples of the preferred first aluminum-base alloy: 6063, nominal composition by weight, Al-0.7% Mg-0.4% Si; 6082, nominal composition by weight Al-0.9% Mg-1.0% Si-0.7% Mn; 6106, nominal composition by weight Al-0.6% Mg-0.45% Si-0.25% Cu and 6351 nominal composition by weight Al-0.6% Mg-1.0% Si-0.6% Mn.

The infiltrant must melt at a temperature higher than that required for skeleton formation. The infiltrant must melt at a temperature below the melting temperature of the powder mixture. In addition, the infiltrant must have sufficient fluidity and a sufficiently low viscosity to flow through the interconnected pores of the composite. In addition, the contact angle between a bead of the infiltrant and the skeleton must be sufficiently low to support good wettability. A contact angle of greater than 90° is typically viewed as non-wetting while a contact angle of less than 90° is viewed as wetting; the closer to 0° contact angle, the more effective the infiltration. Further considerations are the solubility of the aluminum alloy powder in the liquid infiltrant and the phase diagram of the combination of aluminum alloy powder and infiltrant. A large number of phases or a number of transient phases is not desirable, since that could lead to inhomogeneity in the solidified composite.

Suitable alloys for the infiltrant are eutectic or near eutectic aluminum based alloys. By near eutectic it is meant within about 5% of the eutectic, for example the binary aluminum copper eutectic is about 33%, by weight, copper, the near eutectic is about 28% to about 33% copper. The infiltrant may be an aluminum based alloy further containing one or more of the following: copper, magnesium, silicon, zinc, titanium, zirconium, iron, silver, lead, tin, bismuth, antimony, strontium, sodium and nickel. In addition to aluminum-base alloys, aluminum with up to about 53%, by weight copper alloy is also acceptable.

As a non-exclusive list, the following alloys are useful as the infiltrant. All compositions are specified in weight percent. Each composition may contain other, unspecified elements in amount that does not materially affect the infiltration properties described above.

| | |
|---|---|
| Silicon | 8%–18% |
| Magnesium | 3%–7% |
| Aluminum | balance. |
| Nominal (Al-13.8% Si-4.7% Mg) | melting temperature of 557° C. |
| Copper | 28%–38% |
| Aluminum | balance. |
| Nominal (Al-33% Cu) | melting temperature of 548.2° C. |
| Silicon | 8%–12% |
| Zinc | 8%–12% |
| Nickel | up to 8% |
| Aluminum | balance. |
| Silicon | 8%–12% |
| Zinc | 8%–12% |
| Nickel | 3%–8% |
| Aluminum | balance. |
| Nominal (Al-10.5% Si-10% Zn-5.5% Ni) | melting temperature of 549° C. |
| Silicon | 8%–18% |
| Aluminum | balance. |
| Nominal (Al-12% Si) | melting temperature of 577 ± 1° C. |

Once at infiltration temperature, generally about 10° C. above the melting temperature of the infiltrant, the part is held at temperature for a time effective for complete infiltration, as illustrated in FIG. 1 by numeral 16, of molten infiltrant into the preform, on the order of about 1 to about 15 hours, and preferably from about 2 hours to about 10 hours. At which time the part is cooled, typically at a rate of from about 1° C. per minute to about 5° C. per minute, and nominally 2° C./minute, to solidify, as illustrated in FIG. 1 by numeral 18.

Following solidification, the strength of the part may be increased by heat treating the infiltrated part. One suitable heat treatment is to heat to from about 500° C. to about 550° C. for from about 1 to about 24 hours followed by a water quench. Additional strength is achieved through age hardening, either at room temperature (natural aging) or at elevated temperatures, typically at about 100° C. to about 200° C., for a time effective to promote full hardening.

Other post-solidification treatments may include hot isostatic pressing to close residual porosity and polishing or sand blasting to provide a smooth finish to the part.

Figure 2:
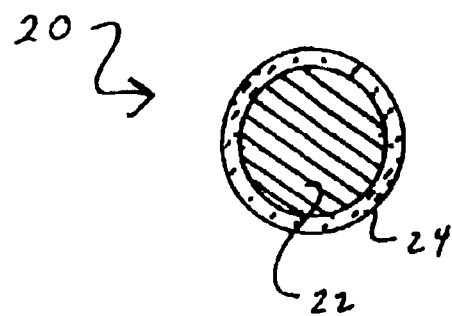
FIG. 2. shows in cross-sectional representation an aluminum alloy particle used to form the porous mass in accordance with an embodiment of the invention.
Figure 3:
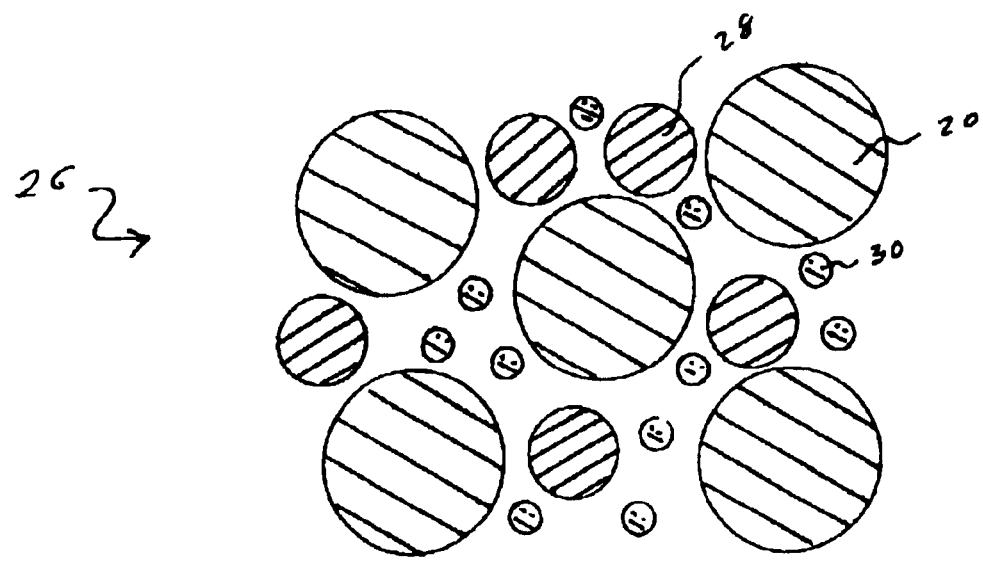
FIG. 3 shows in cross-sectional representation a blend of powders in accordance with an embodiment of the invention.

The mechanism by which the Applicants successfully spontaneously infiltrated an aluminum alloy with a different aluminum alloy is believed to be the following. This represents Applicants best understanding of the process as of the filing of the patent application. With reference to FIG. 2, a particle of aluminum alloy powder 20 has a metallic core 22, such as, by weight, nominally Al-1% Mg-0.6% Si-0.25% Cu-0.25% for aluminum alloy 6061. Surrounding the core 22 is a thin, chemically and thermally stable, alumina film 24. With reference to FIG. 3, a blended mixture of powders 26 is formed. The mixture 26 includes aluminum or aluminum alloy particles 20 (the alumina film is present, but sufficiently thin not to be illustrated in FIG. 3), oxygen scavenger particles 28, such as magnesium, and a polymer binder 30, such as nylon-12. As nominal quantities, there is about 2%, by weight of the oxygen scavenger and about 10% by volume of the binder with the balance aluminum alloy particles.

Figure 4:
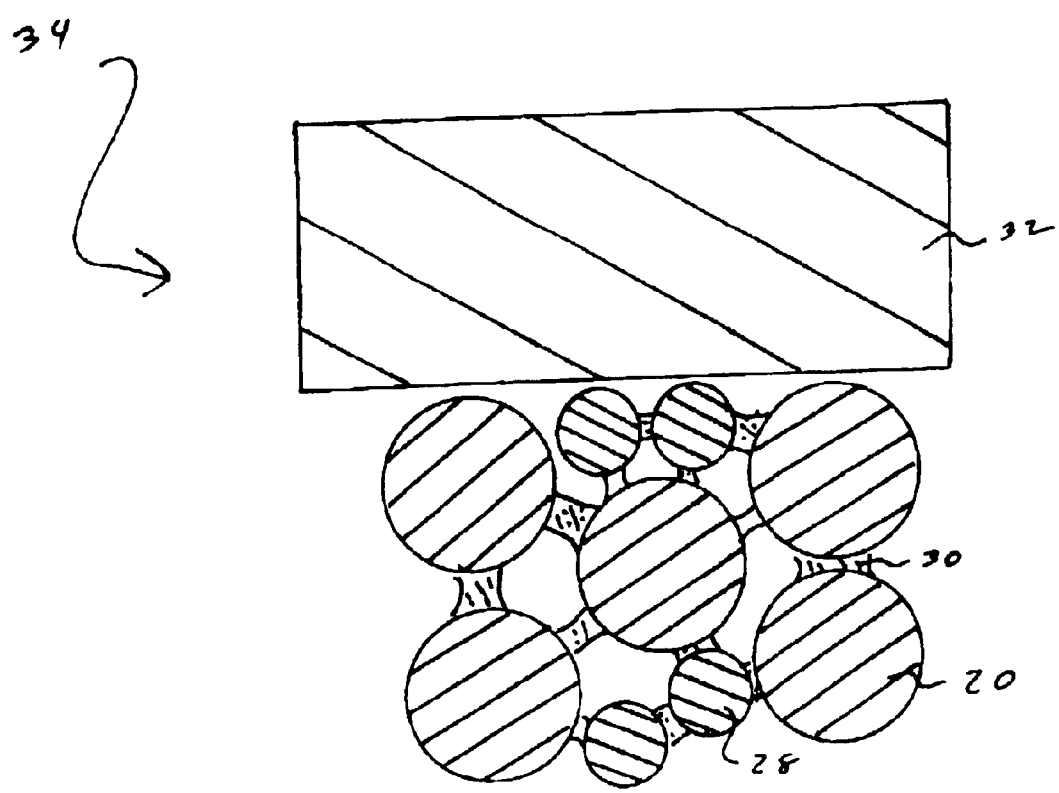
FIG. 4 shows in cross-sectional representation the effect of initial heating on the blend of powders shown in FIG. 3.

With reference to FIG. 4, the blend of powders of FIG. 3 is formed into a desired near net shape, such as by rapid prototyping and optionally surrounded by a support layer, such as a mixture of alumina and magnesium powders (not shown). A desired infiltrant 32, such as, by weight, nominally Al-13.8% Si-4.7% Mg, is placed in contact with the blend of powders. The assembly 34 is then heated in an inert atmosphere, preferably nitrogen containing and more preferably, substantially only nitrogen to a temperature effective to melt the polymer binder 30, without melting any of the metallic components (aluminum alloy powder 20, oxygen scavenger 28 and infiltrant 32). For a nylon-12 binder, this temperature is in the range from about 150° C. to about 300° C.

Figure 5:
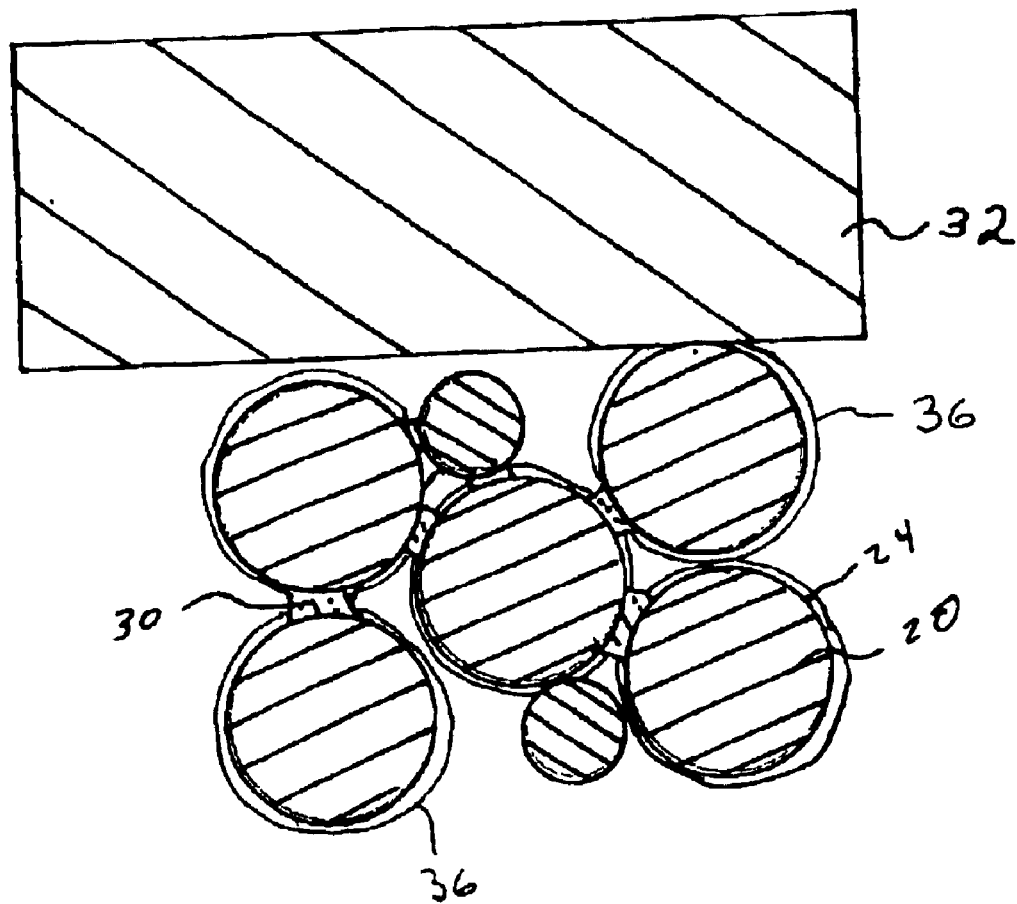
FIG. 5 shows in cross-sectional representation the effect of further heating on the blend of powders shown in FIG. 3.

With reference to FIG. 5, as the blend of powders of FIG. 3 is further heated, such as through the temperature range of from about 300° C. to about 540° C. in nitrogen, the polymer binder 30 begins to decompose. If the polymer binder 30 is nylon-12, the binder decomposes to a carbonaceous residue, $\epsilon$-Caprolactam ($C_6H_{11}NO$) and gaseous fixed nitrogen species such as HCN, $N_2O$ and $NH_3$. Gaseous carbon species such as CO and $CO_2$ are also formed.

While the assembly may be moved to different ovens to achieve the desired thermal exposures, it is preferred that the assembly remain in a single atmosphere controlled oven programmed with temperatures and time periods sufficient to perform each process step in series.

When zinc is present as the wetting agent in the preform powder material as the temperature exceeds 450° C., the zinc melts and, within the preform, the zinc vapour pressure increases, approaching 50 mm Hg at 540° C. Zinc oxides are reduced to zinc metal in the presence of carbon and carbon monoxide. The zinc metal coats the alumina film 24 of the aluminum particles 20 assisting in wetting during infiltration.

When tin is present in the aluminum alloy, the tin melts as the temperature exceeds its melting point. Because tin has a very high fluidity, in this molten state it wets the alumina, promoting infiltration by the molten aluminum while also increasing the fluidity of the molten aluminum. A similar mechanism takes place with the other wetting agents.

Without being bound by theory, on further heating from 490° C. to 560° C., the magnesium vapour pressure approaches 0.5 mm Hg at 540° C. within the preform. It is theorized that magnesium nitride forms from direct interaction with the nitrogen gas:

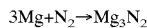

It is theorized that the magnesium nitride plates-out along the alumina film 24 of the aluminum alloy powder 20 and begins forming a spinel ($MgAl_2O_4$) along dislocations in the alumina film, causing dilation and cracking of the film that exposes free aluminum. The infiltrant 32 reaches its melting temperature and begins wetting the free aluminum and spinel.

Figure 6:
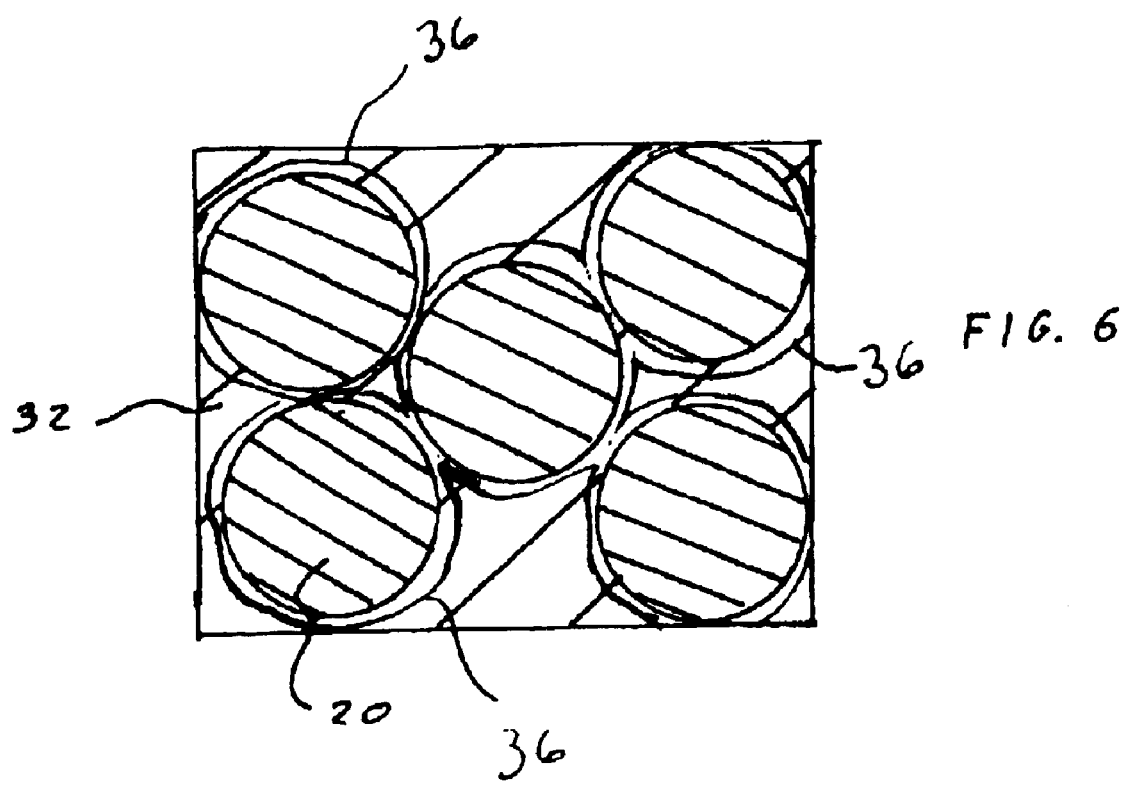
FIG. 6 shows in cross-sectional representation the effect of still further heating on the blend of powders shown in FIG. 3.

The spinel reaction continues to form with time and a supply of magnesium nitride, when the temperature is in the 540° C.–570° C. range. With reference to FIG. 6, after approximately 4–8 hours at 570° C., capillary pressure has driven the molten infiltrant 32 through all pores between aluminum alloy particles 20 in the preform structure. On cooling, the preform achieves a density very close to the theoretical maximum without the need for external pressure.

With reference to FIG. 5, after the removal of the binder, the part is held at a temperature between the temperatures at which the aluminum nitride compound forms and the temperature at which infiltration occurs. By applying an isothermal hold in this temperature band, and providing the oxygen content is sufficiently low, partial conversion of the aluminum to an aluminum nitride compound occurs. Growth of the aluminum nitride compound results in the formation of a rigid skeleton 36. The hold time should be such as to allow sufficient but not excessive formation of this skeleton 36. Typically, a hold time of about 2 hours at about 540° C. is used. Once skeleton 36 has formed, the temperature is increased to above that at which the infiltrant becomes molten to allow spontaneous or pressureless infiltration of the part. The part is held at the infiltration temperature sufficiently long to ensure full penetration of the liquid, typically about 2 to about 4 hours, as illustrated in FIG. 6.

The above invention will become more apparent from the Examples that follow.

EXAMPLES

Example 1

A green composite was made by selective laser sintering of a powder mixture containing 6061 powder, 2 wt % Mg, 1 wt % Sn and 10 vol % nylon binder using each of the nylon binders previously recited as being commercially available from Atofina S.A. An infiltrant with a composition, by weight, of Al-13.8Si-4.9Mg was placed in contact with the preform. The amount of the infiltrant was sufficient to just fill the pore volume. The assembly was then placed inside a crucible and covered with a support powder consisting of alumina containing 1 vol % Mg powder. The crucible was then placed inside a nitrogen-atmosphere furnace and heated at approximately 90° C. per hour to a temperature of 540° C. and held for a period of 2 hours to allow the skeleton to form. The furnace temperature was then increased at the same rate to 570° C. and held for 4 hours to allow spontaneous infiltration of the whole preform. The parts were then furnace cooled until the temperature was below 200° C. and then removed from the furnace and air-cooled. The parts were removed from the support powder and sand blasted. The density of each part was close to the theoretical density for the aluminum-base alloy.

The addition of the Sn to the powder mixture provided a liquid phase within the aluminum preform during the furnace heating that enhanced the wettability of the porous structure formed in the green preform. It also improved the fluidity of the molten phase of the aluminum alloy 6061. This results because the Sn wetting agent is melted within the solid aluminum alloy preform and it coats or otherwise covers the the alumina film that forms on the powder particles. The result was faster infiltration of the porous structure by the infiltrant. The Sn also reduced the tendency of larger parts to crack, reduced the melt viscosity and increased the fluidity of the molten infiltrant.

Similarly successful infiltrations were obtained by the processes recited in Examples 2 through 7 that follow.

Example 2

An alloy was made and processed as per Example 1 but with an infiltrant composition of Al-33wt % Cu.

Example 3

An alloy was made and processed as per Example 1, but with an infiltrant composition of Al-10.5Si-10Zn-5.5Ni.

Example 4

An alloy was made and processed as per Example 1, but with an infiltrant composition of Al-12Si and an infiltration temperature of 590° C.

Example 5

An alloy was made and processed as per Example 1, but the initial powder mixture consisted of 6061 powder and 10 vol % nylon binder.

Example 6

An alloy was made and processed as per Example 1, but the initial powder mixture consisted of aluminum powder, 2 wt % Mg and 10 vol % nylon binder.

Example 7

A green body consisting of a powder mixture containing 6061 powder, 2 wt % Mg, 1 wt % Zn and 10 vol % nylon binder using each of the nylon binders previously recited as being commercially available from Atofina S.A., was made by placing the powder mixture in a mould and heating this to a temperature above the melting point of the nylon. On cooling, the resin-body green body was extracted from the mould and processed as per Example 1. Faster infiltration of the porous structure and parts with reduced cracking and enhanced ductility were obtained using the Zn wetting agent, although to a lesser degree than with Sn used in Examples 1–6.

It should be noted that the present process is applicable to other materials and compositions, and one skilled in the art will understand that the alloys, blend percentages, particle sizes, and temperatures described herein are presented as examples and not limitations of the present invention.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for the manufacture of a three-dimension object, comprising the steps of:
    a). forming a mixture that contains a binder, a wetting agent, and at least one of aluminum or a first aluminum-base alloy into a green composite by the additive process of laser sintering;
    b). removing said binder from said green composite forming a porous preform structure; and
    c). reacting the at least one of aluminum or first aluminum-based alloy with nitrogen gas to form an aluminum nitride continuous rigid skeleton that supports the porous preform structure; and
    d). infiltrating said porous preform structure with an infiltrant that is a molten second aluminum base alloy to form said three-dimensional object with near theoretical density.

2. The method of claim 1 wherein the wetting agent is one selected from the group consisting of tin, zinc, bismuth, lead, antimony, silver and alloys thereof.

3. The method of claim 2 wherein said first aluminum base alloy is selected to be an alloy with copper, magnesium, silicon, zinc, titanium, chromium, zirconium, nickel, iron, manganese, silver, and mixtures thereof.

4. The method of claim 2 wherein said first aluminum base alloy is alloyed with silicon.

5. The method of claim 4 wherein said first aluminum base alloy is alloyed with a combination of silicon and magnesium.

6. The method of claim 5 wherein said first aluminum base alloy is selected to be, by weight, about 0.4% to about 0.8% silicon, about 0.15% to about 0.40% copper, about 0.8% to about 1.2% magnesium, about 0.04% to about 0.35% chromium and the balance is aluminum and unavoidable impurities.

7. The method of claim 2 wherein said binder is selected to be a polymer that substantially decomposes to gases at a temperature of between about 300° C. and about 500° C. in a nitrogen-base atmosphere.

8. The method of claim 7 wherein said binder is selected to be a nylon.

9. The method of claim 2 including an addition of magnesium as an oxygen scavenger to said mixture.

10. The method of claim 8 wherein said infiltrant is selected to be a eutectic or near eutectic of aluminum with copper, magnesium, silicon, zinc, titanium, zirconium, iron, silver, lead, tin, bismuth, antimony, strontium, sodium, nickel and mixtures thereof.

11. The method of claim 10 wherein said infiltrant is selected to include silicon and magnesium.

12. The method of claim 10 wherein said infiltrant is selected to have a nominal composition, by weight, of 13.8% silicon, 4.7% magnesium and the balance is aluminum and inevitable impurities.

13. The method of claim 10 wherein said infiltrant is selected to have a nominal composition, by weight, of less than about 53% copper and the balance is aluminum and inevitable impurities.

14. The method of claim 1 wherein steps (b)–(c) are performed in a nitrogen-base atmosphere.

15. A method for the manufacture of a three-dimensional object having a desired shape, comprising the steps of:
    a) forming a mixture that contains a binder, wetting agent, and at least one of aluminum or a first aluminum-base alloy into a green composite having said desired shape by the additive process of laser sintering;
    b) removing said binder from said green composite by a process effective to maintain said desired shape as a porous preform structure;
    c) converting a portion of said aluminum to aluminum nitride by reacting the at least one of aluminum or first aluminum-base alloy with nitrogen to thereby transform said green composite to a continuous rigid aluminium nitride skeleton of said desired shape that supports said porous preform structure; and
    d) infiltrating said porous structure with an infiltrant that is a molten second aluminum-base alloy to form said three-dimensional object with a near theoretical density.

16. The method of claim 15 wherein the wetting agent is one selected from the group consisting of tin, zinc, bismuth, lead, antimony, silver and alloys thereof.

17. The method of claim 16 wherein prior to step (b), said porous preform structure is surrounded with a porous support structure, said porous support structure selected to include both a ceramic and an oxygen scavenger.

18. The method of claim 16 wherein said first aluminum base alloy is selected to be an alloy with copper, magnesium, silicon, zinc, titanium, chromium, zirconium, nickel, iron, manganese, silver, and mixtures thereof.

19. The method of claim 16 wherein said first aluminum base alloy is alloyed with silicon and magnesium.

20. The method of claim 16 wherein said binder is selected to be a nylon polymer that substantially decomposes to gases at a temperature of between about 300° C. and about 500° C. in a nitrogen-base atmosphere.

21. The method of claim 16 including an addition of magnesium as an oxygen scavenger to said mixture.

22. The method of claim 16 including the step of forming a nitride skeleton within said porous preform structure by exposure to nitrogen at low oxygen partial pressure.

23. The method of claim 16 wherein said infiltrant is selected to be a eutectic or near eutectic of aluminum with copper, magnesium, silicon, zinc, titanium, zirconium, iron, silver, lead, tin, bismuth, antimony, strontium, sodium, nickel and mixtures thereof.

24. The method of claim 23 wherein said infiltrant is selected to include silicon and magnesium.

25. The method of claim 24 wherein said infiltrant is selected to have a nominal composition, by weight, of 13.8% silicon, 4.7% magnesium and the balance is aluminum and inevitable impurities.

26. The method of claim 23 wherein said infiltrant is selected to have a nominal composition, by weight, of less than about 53% copper and the balance is aluminum and inevitable impurities.

27. The method of claim 16 wherein steps (b)–(d) are performed in a nitrogen-base atmosphere.

28. The method of claim 27 wherein step (b) is at a temperature of between about 300° C. and about 500° C., step (c) is at a temperature of from about 500° C. to about 570° C. and step (d) is at a temperature of from about 540° C. to a temperature in excess of about 540° C., but less than the melting or solidus temperature of the first aluminum alloy.

29. A method for the manufacture of a three-dimensional object, comprising the steps of:
 a) forming a mixture that contains a binder, wetting agent, and at least one of aluminum or a first aluminum-base alloy into a green composite by the additive process of laser sintering;
 b) removing said binder from said green composite forming a porous preform structure;
 c) transforming a portion of the aluminum for first aluminum base alloy into an aluminum nitride compound by reaction with a nitrogen source to form a continuous rigid aluminum nitride skeleton that supports the porous preform structure; and
 d) infiltrating said porous preform structure with an infiltrant that is a molten second aluminum base alloy to form said three-dimensional object with near theoretical density.

30. The method of claim 29 wherein the wetting agent is one selected from the group consisting of tin, zinc, bismuth, lead, antimony, silver and alloys thereof.

31. The method of claim 30 wherein said first aluminum base alloy is selected to be an alloy with copper, magnesium, silicon, zinc, titanium, chromium, zirconium, nickel, iron, manganese, silver, and mixtures thereof.

32. The method of claim 31 wherein said first aluminum base alloy is alloyed with silicon and magnesium.

33. The method of claim 30 herein said binder is selected to be a nylon polymer that substantially decomposes to gases at a temperature of between about 300° C. and about 500° C. in a nitrogen-base atmosphere.

34. The method of claim 30 including an addition of magnesium as an oxygen scavenger to said mixture.

35. The method of claim 30 including the step of forming a nitride skeleton within said porous preform structure by exposure to nitrogen at low oxygen partial pressure.

36. The method of claim 30 wherein said infiltrant is selected to be a eutectic or near eutectic of aluminum with copper, magnesium, silicon, zinc, titanium, zirconium, iron, silver, lead, tin, bismuth, antimony, strontium, sodium, nickel and mixtures thereof.

37. The method of claim 34 wherein said infiltrant is selected include silicon and magnesium.

38. The method of claim 37 wherein said infiltrant is selected to have a nominal composition, by weight, of 13.8% silicon, 4.7% magnesium and the balance is aluminum and inevitable impurities.

39. The method of claim 36 wherein said infiltrant is selected to have a nominal composition, by weight, of less than about 53% copper and the balance is aluminum and inevitable impurities.

40. The method of claim 30 wherein steps (b)–(d) are performed in a nitrogen-base atmosphere.

41. The method of claim 40 wherein step (b) is at a temperature of between about 300° C. and about 500° C., step (c) is at a temperature of from about 500° C. to about 570° C. and step (d) is at a temperature of from about 540° C. to a temperature in excess of about 540° C., but less than the melting or solidus temperature of the first aluminum alloy.

42. The method of claim 30 wherein prior to step (b), said porous preform structure is surrounded with a porous support structure, said porous support structure selected to include both a ceramic and an oxygen scavenger.

43. The method of claim 42 in which said oxygen scavenger is selected to be magnesium.

* * * * *